United States Patent
Mi et al.

(10) Patent No.: US 7,673,029 B2
(45) Date of Patent: Mar. 2, 2010

(54) GRID AUTOMATION BUS TO INTEGRATE MANAGEMENT FRAMEWORKS FOR DYNAMIC GRID MANAGEMENT

(75) Inventors: Zheng Mi, Union City, CA (US); Sowmya Subramanian, Mountain View, CA (US)

(73) Assignee: Oracle International Corporation, Redwood Shores, CA (US)

( * ) Notice: Subject to any disclaimer, the term of this patent is extended or adjusted under 35 U.S.C. 154(b) by 1001 days.

(21) Appl. No.: 11/306,081

(22) Filed: Dec. 15, 2005

(65) Prior Publication Data

US 2007/0011291 A1    Jan. 11, 2007

Related U.S. Application Data

(60) Provisional application No. 60/595,485, filed on Jul. 9, 2005.

(51) Int. Cl.
*G06F 15/173* (2006.01)
(52) U.S. Cl. ...................................................... 709/223
(58) Field of Classification Search ................ 709/200, 709/223, 226; 705/35, 201; 713/201
See application file for complete search history.

(56) References Cited

U.S. PATENT DOCUMENTS

| | | | |
|---|---|---|---|
| 2002/0152145 A1* | 10/2002 | Wanta et al. | 705/35 |
| 2004/0044718 A1* | 3/2004 | Ferstl et al. | 709/200 |
| 2005/0015619 A1* | 1/2005 | Lee | 713/201 |
| 2005/0222931 A1* | 10/2005 | Mamou et al. | 705/35 |
| 2006/0294238 A1* | 12/2006 | Naik et al. | 709/226 |

* cited by examiner

*Primary Examiner*—Quang N. Nguyen
*Assistant Examiner*—Tesfay Yohannes
(74) *Attorney, Agent, or Firm*—Aka Chan LLP (57) ABSTRACT

Methods and apparatus that integrate management frameworks with an enterprise manager in a grid computing environment are disclosed. According to one aspect of the present invention, a grid computing system includes a management arrangement and at least a first management framework. The management arrangement includes an integration arrangement that brokers requests. The first management framework sends a first request to the integration arrangement which effectively allows the first management framework to communicate bi-directionally with the management arrangement.

9 Claims, 8 Drawing Sheets

GRID AUTOMATION BUS TO INTEGRATE MANAGEMENT FRAMEWORKS FOR DYNAMIC GRID MANAGEMENT

CROSS-REFERENCE TO RELATED APPLICATION

This patent application claims priority of U.S. Provisional Patent Application No. 60/595,485, filed Jul. 9, 2005, which is incorporated herein by reference in its entirety.

BACKGROUND OF THE INVENTION

1. Field of Invention

The present invention relates to grid computing systems. More specifically, the invention relates to allowing different management frameworks to be integrated for use with an enterprise management system.

2. Description of the Related Art

Grid computing is a type of distributed computing that is becoming more prevalent as the use of shared resources in computing systems increases. In grid computing, computing and information resources are shared substantially transparently in a secure, highly efficient manner. In other words, computing and information resources are provided using a plurality of computers or computing systems which function as an overall virtual computing system. Once a grid is in place, a user may effectively have access to a virtual computing system that is adaptable and reliable. Such a virtual computing system generally includes a variety of different computing resources which are not individually "visible" to the user. A user is typically only aware that information or computation may be requested and delivered, and is not aware of the source which processes and delivers on the request. That is, while a user may not be aware which component of a grid processes and delivers on a request, the user is aware that a request will be acted on by some component of the grid.

A collection of networked grid components, e.g., different management frameworks and databases, that are managed by a single enterprise is an enterprise grid. The single enterprise may be a business entity that is responsible for managing a pool of resources, a set of services, and the assignment of resources to services such that business goals may be accomplished. Within an enterprise grid, networked resources may be pooled and shared, and services may be substantially automatically provisioned. An enterprise may provision resources and services to efficiently respond to a request from a user or a client.

By distributing work across many computing systems, enterprise grid computing enhances the availability and scalability of resources. Resources and services or, more generally, computing systems that are included in an enterprise grid, are typically associated with management frameworks. Such management frameworks, which may each include computers and databases, are integrated such that they may function overall as a virtual computing system using an enterprise manager. The enterprise manager typically identifies a management system or framework, i.e., a server, that is most appropriate for providing a resource or a service requested by another management system or framework, i.e., a client.

In some instances, management frameworks created by different vendors or parties are used within an enterprise grid computing system. Unless the management frameworks are integrated, the management of the enterprise grid is generally highly complex, time consuming, tedious, and maybe even infeasible. It involves a lot of manual intervention at the best.

Figure 1:
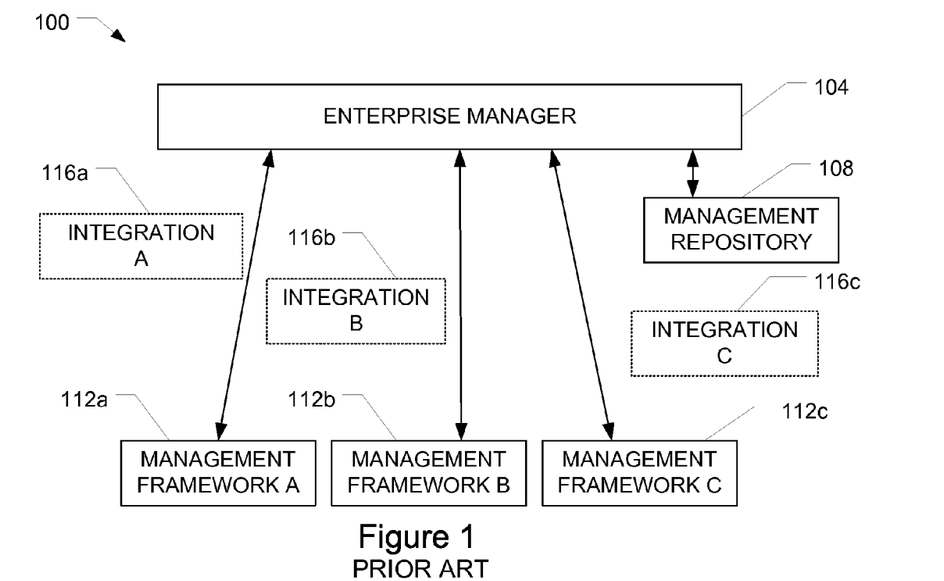
FIG. 1 is a diagrammatic representation of an enterprise grid computing system.

Interfaces between an enterprise manager and each management framework may be created to facilitate the integration of the management frameworks. With reference to FIG. 1, the interfaces between management systems or management frameworks and an enterprise manager will be described. An enterprise grid computing system 100 generally includes an enterprise manager 104 that is in communication with a management repository 108, and a plurality of management frameworks 112a-c, or third-party management systems. Typically, enterprise manager 104 is in itself a management framework that is arranged to monitor or to manage applications and databases associated with a management framework (not shown) which was created such that it is compatible with enterprise manager 104. That is, enterprise manager 104 is typically configured to substantially automatically manage applications and databases that are created by the same party that created enterprise manager 104.

Management frameworks 112a-c, as shown, are third-party management systems with respect to enterprise manager 104. In other words, management frameworks 112a-c and enterprise manager 104 are not created by the same party. Hence, management frameworks 112a-c generally must be integrated with enterprise manager 104 if enterprise manager 104 is to effectively manage, monitor, and troubleshoot within enterprise grid computing system 100. Integrations 116a-c are typically created by management frameworks 112a-c to enable management frameworks 112a-c to interface with enterprise manager 104. By way of example, management framework 112a creates integration 116a that allows enterprise manager 104 to manage management framework 112a, as well as to enable enterprise manager 104 to communicate bi-directionally with management framework 112a.

To enable management frameworks 112a-c to create integrations 116a-c, enterprise manager 104 generally publishes data in the form of application programming interfaces (APIs) that may be accessed by management frameworks 112a-c to determine how to create integrations 116a-c. The same is also true for the integrating management frameworks. It should be appreciated that creating integrations 116a-c is often time-consuming. As APIs are not standardized, the process of creating integrations 116a-c is a tedious, non-scaleable process. Often, any change to either a management framework 112a-c or to enterprise manager 104 may result in changes having to be made to a corresponding integration 116a-c. Further, as some enterprise managers 104 do not actually publish APIs, it may not always be possible to integrate a management framework 112a-c with enterprise manager 104.

Figure 2:
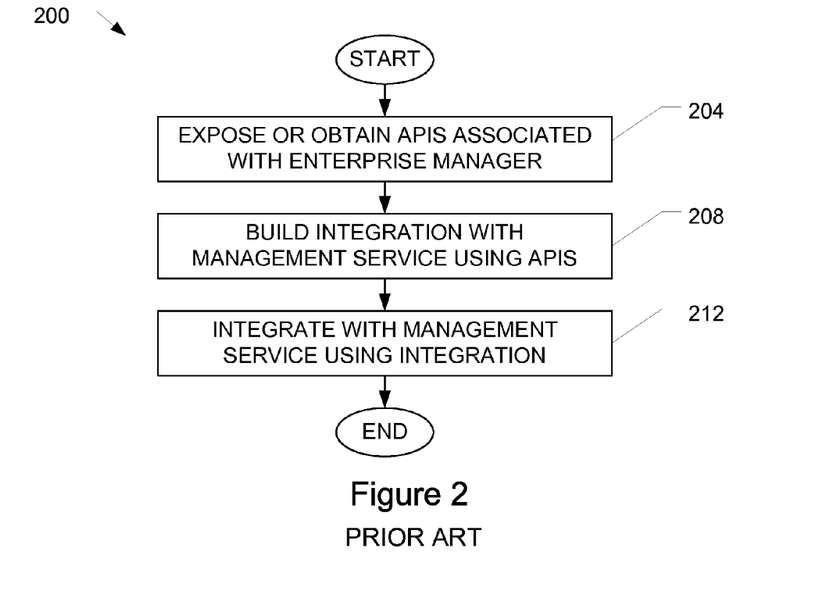
FIG. 2 is a process flow diagram which illustrates a method of integrating a management framework with an enterprise manager.

In general, enterprise manager 104 and management frameworks 112a-c may communicate bi-directionally through integrations 116a-c that are point-to-point connections. In other words, enterprise manager 104 calls management frameworks 112a-c substantially directly using integrations 116a-c, and management frameworks 112a-c call enterprise manager 104 substantially directly using integrations 116a-c. In order to establish integrations 116a-c, as previously mentioned, management frameworks 112a-c typically access APIs associated with enterprise manager 104. With reference to FIG. 2, the steps associated with a standard method of allowing an enterprise manager and a management framework to communicate substantially directly will be described. A method 200 of allowing a management framework, i.e., a third-party management framework relative to an enterprise manager, to communicate substantially directly with the enterprise manager begins at step 204 in which APIs associated with the enterprise manager are exposed or otherwise obtained by the management framework. An integration is built in step 208 by the management framework using the APIs. An integration is generally arranged to enable the management framework to be integrated with a management service associated with the enterprise manager. That is, an integration is built that essentially allows the enterprise manager to communicate with the management framework bi-directionally such that the enterprise manager may manage the management framework.

Once the integration is built, the management framework is integrated with the management service associated with the enterprise manager using the integration in step 212. After the management framework is integrated with the enterprise manager, the process of allowing an enterprise manager and the management framework to communicate substantially directly is completed.

If an enterprise manager does not publish APIs, it may not be possible to integrate a third-party management framework with the enterprise manager. Even when APIs are published, creating an integration between the enterprise manager and the third-party management framework may be time-consuming. Further, as previously mentioned, creating a point-to-point connection or an integration between a third-party management framework and an enterprise manager, while effective, is not scaleable. By way of example, if there is a change to an API associated with the enterprise manager, the integration may need to be updated. In addition, each time a new, different third-party management framework is to be managed by the enterprise manager, a new integration generally must be created.

As allowing management frameworks to be integrated and managed by an enterprise manager within an enterprise grid computing system is critical to the operation of the enterprise grid computing system, what is desired is a method and an apparatus which allows management frameworks to be efficiently integrated with an enterprise manager. That is, what is needed is an integration arrangement that effectively allows management frameworks to be integrated with an enterprise manager substantially without requiring the management frameworks to create individual integrations for use with the enterprise manager.

SUMMARY OF THE INVENTION

The present invention relates to integrating management frameworks with an enterprise manager in a grid computing environment using an integration arrangement. According to one aspect of the present invention, a grid computing system includes a management arrangement and at least a first management framework. The management arrangement includes an integration arrangement that brokers requests. The first management framework sends a first request to the integration arrangement which effectively allows the first management framework to communicate bi-directionally with the management arrangement.

In one embodiment, the grid computing system includes a second management framework that is in communication with the integration arrangement. In such an embodiment, the integration arrangement enables the first management framework to communicate bi-directionally with the second management framework, and also allows the second management framework to communicate bi-directionally with the management arrangement.

An integration arrangement, or a grid integration broker, with which the enterprise manager and the management frameworks are each in communication, allows requests to be brokered across the management frameworks substantially without requiring individual integrations to be created between each management framework and the enterprise manager. Providing an integration arrangement substantially eliminates the need to create customized integrations, as the integration arrangement may be compatible with a common object or descriptive model or may accept transformers that convert otherwise proprietary model formats into a common object or descriptive model. The integration broker also bridges between different protocols that different management frameworks may use during the communication through transformers. Hence, the use of an integration arrangement provides a scaleable, efficient manner in which components may be incorporated into a grid computing system. In one embodiment, the integration broker also controls concurrency and integrity of requests issued on the managed grid environment to make sure the management is undertaken in a coordinated manner.

According to another aspect of the present invention, an integration arrangement that is in communication with a plurality of management frameworks and a manager in a grid computing system includes a grid integration broker that brokers a request across the plurality of management frameworks and the enterprise manager. The integration arrangement also includes a management service that interprets the request and provides the request to the manager. In one embodiment the grid integration broker is arranged to expose a web service to the plurality of management frameworks, wherein the plurality management frameworks are arranged to invoke the web service. In another embodiment, the grid integration broker includes a first transformer associated with a first management framework, and when the request is initiated by the first management framework, the first transformer is arranged to transform the request into a model in a format associated with the manager.

According to yet another aspect of the present invention, a method of operating an integration arrangement that brokers requests within a grid computing system across management frameworks includes receiving a request from a first management framework and providing the request to the manager. The manager provides information associated with the request. The integration arrangement receives the information from the manager, and provides the information to the first management framework. In one embodiment, the method also includes registering the first management framework. In such an embodiment, registering the first management framework may include receiving a transformer from the first management framework.

Other features and advantages of the invention will become readily available apparent upon review of the following description in association with the accompanying drawings, where the same or similar structures are designated with the same reference numerals.

BRIEF DESCRIPTION OF THE DRAWINGS

The invention may best be understood by reference to the following description taken in conjunction with the accompanying drawings in which.

DETAILED DESCRIPTION OF THE EMBODIMENTS

In the description that follows, the present invention will be described in reference to embodiments that test subsystems on a platform for a software application, such as a database application. However, embodiments of the invention are not limited to any particular architecture, environment, application, or implementation. For example, although embodiments will be described in reference to network database applications, the invention may be advantageously applied to any software application. Therefore, the description of the embodiments that follows is for purposes of illustration and not limitation.

Within a grid computing system such as an enterprise grid computing system, the ability to integrate management frameworks with a manager, e.g., an enterprise manager, regardless of the origins of the management frameworks is critical to enable the grid computing system to operate efficiently. The use of an integration arrangement, or a grid integration broker, to which the enterprise manager and the management frameworks are each connected allows requests to be brokered across the management frameworks substantially without requiring point-to-point connections between the management frameworks. Computational resources and data associated with each of the management frameworks may be shared between the management frameworks such that each management framework may effectively access and substantially manage computational resources and data associated with other management frameworks.

A standard model may be defined for requests, and vendors of the management frameworks may either conform to the standard model or provide a transformer that allows specific, as for example vendor proprietary, models to be converted into a format that is consisted with the standard model. A management framework may effectively register itself with an integration arrangement and, if appropriate, would register its transformer with the integration arrangement. Once a management framework is registered with the integration arrangement, the integration arrangement will enable bi-directional communications between the management framework and other components that are registered with or otherwise connected to the integration arrangement substantially without establishing direct point-to-point connections between the management framework and other components. In addition, the integration arrangement may broker requests, e.g., dynamic provisioning requests, across the management framework and other components, and also allow for data aggregation, e.g., the aggregation of monitoring metrics and alerts.

Figure 3A:
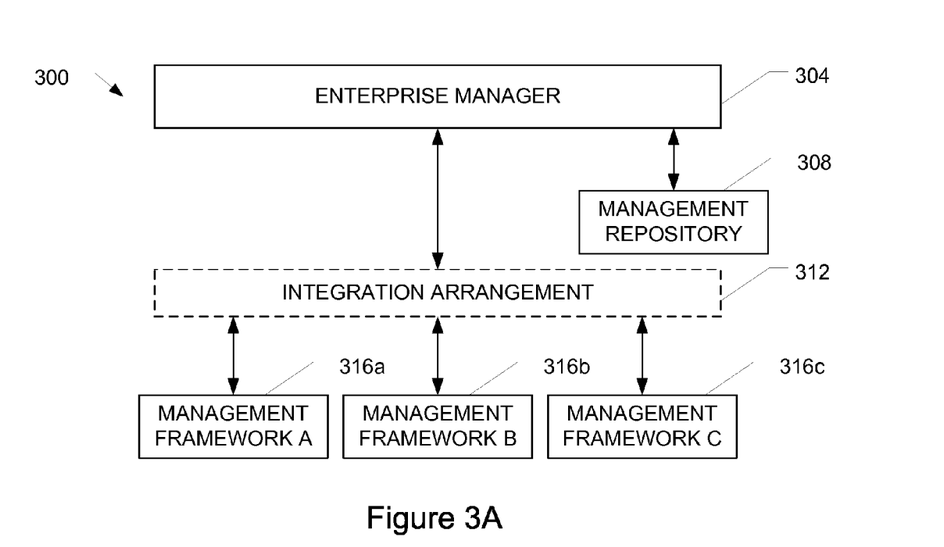
FIG. 3A is a diagrammatic representation of a system in which an integration arrangement is incorporated between management frameworks and an enterprise manager in accordance with an embodiment of the present invention.

An integration arrangement is generally in communication with both an enterprise manager and a plurality of management frameworks. FIG. 3A is a diagrammatic representation of a system in which an integration arrangement is incorporated between management frameworks and an enterprise manager in accordance with an embodiment of the present invention. A system or managed environment 300, which may generally be an enterprise grid computing system, includes an enterprise manager 304 and a plurality of management frameworks 316a-c which may be from a variety of different vendors, i.e., management frameworks 316a-c may include various third-party frameworks. Management frameworks 316a-c may include, but are not limited to, computing systems, clusters of networked computers, databases, and application servers.

Enterprise manager 304 generally has an associated management repository 308 that is arranged to store data, e.g., monitoring data, that is associated with management frameworks 316a-c that are managed or otherwise controlled by enterprise manager 304. Enterprise manager 304 may be substantially any enterprise manager, as for example the Oracle Enterprise Manager, available commercially from Oracle International Corporation of Redwood Shores, Calif.

An integration arrangement 312 is arranged between enterprise manager 304 and management frameworks 316a-c. Integration arrangement 312 is effectively a transformer and coordination interface that allows management frameworks 316a-c to be connected, and allows requests to be brokered across management frameworks 316a-c. That is, integration arrangement 312 allows substantially any management frameworks 316a-c to be substantially registered or "plugged in" such that management frameworks 316a-c may be managed by enterprise manager 304 and such that management frameworks 316a-c may effectively communicate with one another. In one embodiment, integration arrangement 312 includes translation logic associated with a common model that management frameworks 316a-c conform to, and enterprise manager 304 substantially conforms to the common model such that enterprise manager 304 is compatible with the translation logic within integration arrangement 312.

Integration arrangement 312 is generally arranged to receive an object, e.g., an object associated with a request, created by a management framework 316a-c, and to create a model based on the object. Integration arrangement 312 may then send the model to enterprise manager 304, which then either creates a suitable representation of the model and stores the representation in management repository 308 or updates a representation of the model in the management repository. To update a representation of the model, enterprise manager 304 may search other management frameworks 316a-c in system 300 for an appropriate management framework 316a-c to, for example, service a received request. Once the representation of the model is either created or updated, enterprise manager 304 then sends an updated model to integration arrangement 312. In turn, integration arrangement 312 provides this model to the appropriate management framework 316a-c, i.e., the management framework 316a-c that sent the object to integration arrangement 312. The interaction between enterprise manager 304, integration arrangement 312, and management frameworks 316a-c will be described in more detail below with respect to FIGS. 7A and 7B.

Figure 3B:
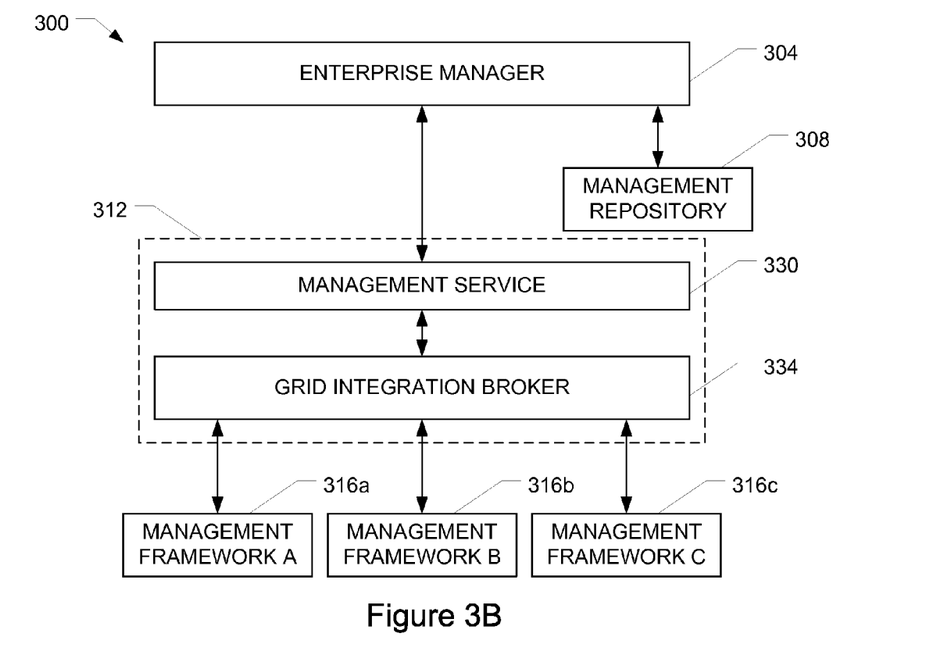
FIG. 3B is a diagrammatic representation of a system in which an integration arrangement that includes a management service and a grid integration broker is incorporated between management frameworks and an enterprise manager, i.e., management frameworks 316a-c and enterprise manager 304 of FIG. 3A, in accordance with an embodiment of the present invention.

With reference to FIG. 3B, components of integration arrangement 312 will be described in accordance with an embodiment of the present invention. Integration arrangement 312 may include a grid integration broker 334 and a management service 330. Grid integration broker 334 and management service 330 cooperate to allow enterprise manager 304 and management frameworks 316a-c to communicate bi-directionally such that enterprise manager 304 may effectively manage management frameworks 316a-c and coordinate among management frameworks 316a-c. Grid integration broker 334 generally exposes web services that management frameworks 316a-c may invoke, and brokers requests from management frameworks 316a-c. Management service 330 generally interprets models and identifies component brokers associated with enterprise manager 304 which may be invoked. In addition, management service 330 may construct models that are responses to brokered requests.

Management service 330 may include a grid control management service interface and various brokers, as will be described below with respect to FIG. 6. In one embodiment, management service 330 is arranged to translate a request received from a management framework 316a-c, which is generally in the form of a model embedded in a message, into a service request that enterprise manager 304 and, further, other management frameworks 316a-c may understand. Grid integration broker 334 is arranged to pass a service request to enterprise manager 304 through management service 330, and to effectively provide the service request to a receiver, e.g., one of management frameworks 316a-c, that is specified by enterprise manager 304 as being suitable for servicing the service request. If the request should be serviced by enterprise manager 304, e.g., an Oracle Enterprise Manager available from Oracle Corporation of Redwood Shores, Calif. as determined by grid integration broker 334, the request is passed to enterprise manager 304, i.e., enterprise manager 304 is involved. Otherwise, in some instances, substantially only grid integration broker 334 is involved in brokering the requests among two management frameworks 316a-c. If substantially only grid integration broker 334 is involved in brokering requests, the associated activities may be recorded by grid integration broker 334 in a repository for grid management.

Typically, grid integration broker 334 causes messages or service requests to be directed to the proper management framework 316a-c for handling the messages or service requests, as determined by enterprise manager 304. That is, grid integration broker 334 brokers request from different management frameworks. If a translation is needed to place the request in a format or a communication protocol that is compatible with the appropriate management framework 316a-c, grid integration broker 334 instantiates an associated translator and maps the request into a suitable model or communication protocol for the appropriate management framework 316a-c. In one embodiment, if a standard format is used for requests, grid integration broker 334 will generally not need to instantiate an associated translator. Grid integration broker 334 may also be arranged to expose web services which may be invoked by management frameworks 316a-c.

Figure 4:
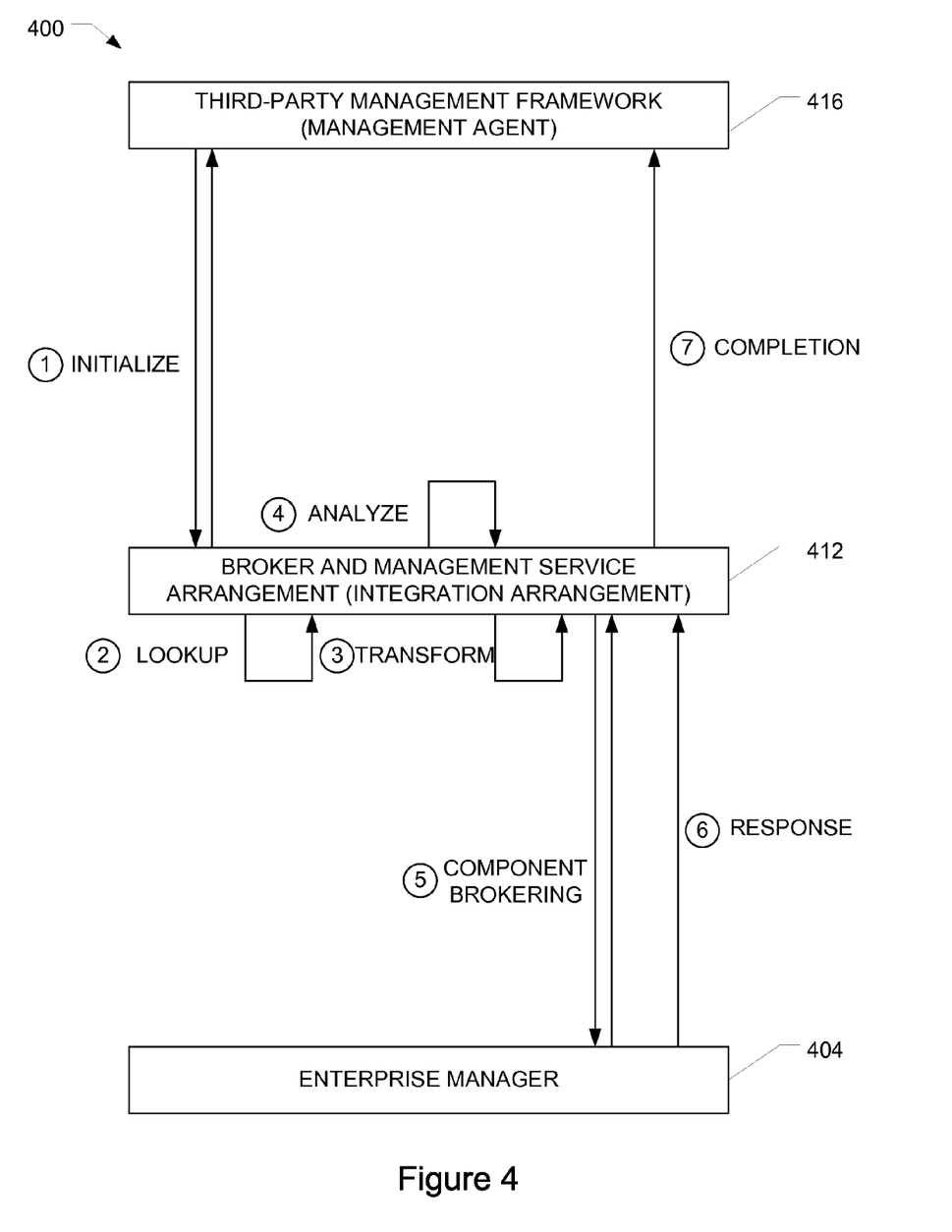
FIG. 4 is a diagrammatic representation of a grid computing system which illustrates actions taken by components of the grid computing system in accordance with an embodiment of the present invention.

The interactions between integration arrangement 312, management frameworks 316a-c, and enterprise manager 304 generally involve bidirectional communications. Referring next to FIG. 4, interactions within a grid computing system or network will be described in accordance with an embodiment of the present invention. A grid computing system 400 includes management frameworks 416, which are generally third-party management frameworks relative to an enterprise manager 404. An integration arrangement 412, or a broker and management service arrangement, is arranged between management frameworks 416 and enterprise manager 404. Management frameworks 416 initialize or otherwise register requests with integration arrangement 412. After requests are initialized or registered, integration arrangement 412 may cause the requests to be looked up, transformed if appropriate, and analyzed. Looking up a request may involve identifying a service type or a system name, for example. In one embodiment, a management service arrangement of integration arrangement 412 may perform runtime monitoring within system 400 while a grid integration broker of integration arrangement 412 may perform a model transformation. Integration arrangement 412 may create models associated with requests.

Component brokering is performed between integration arrangement 412 and enterprise manager 404. If it is appropriate to direct a request to enterprise manager 404 as determined by integration arrangement 412, the request is forwarded to the management services arrangement or interface. The services arrangement or interface will typically examine the request model and determine implied operations. Based on the operations derived through analysis, a sequence of invocations may be passed to the necessary component broker in the right order, i.e., the management services interface may control the order of component brokers to be invoked. A response to a request, which may generally be in the form of a current state model and an identification of a suitable management framework for servicing or otherwise fulfilling a request, are sent by enterprise manager 404 to integration arrangement 412. If the grid integration broker determines that the request has been completed, integration arrangement 412 sends a completion response to the requesting management framework 416. Otherwise, the grid integration may effectively repeat the same process to forward the request to the next appropriate management framework 416.

Figure 5:
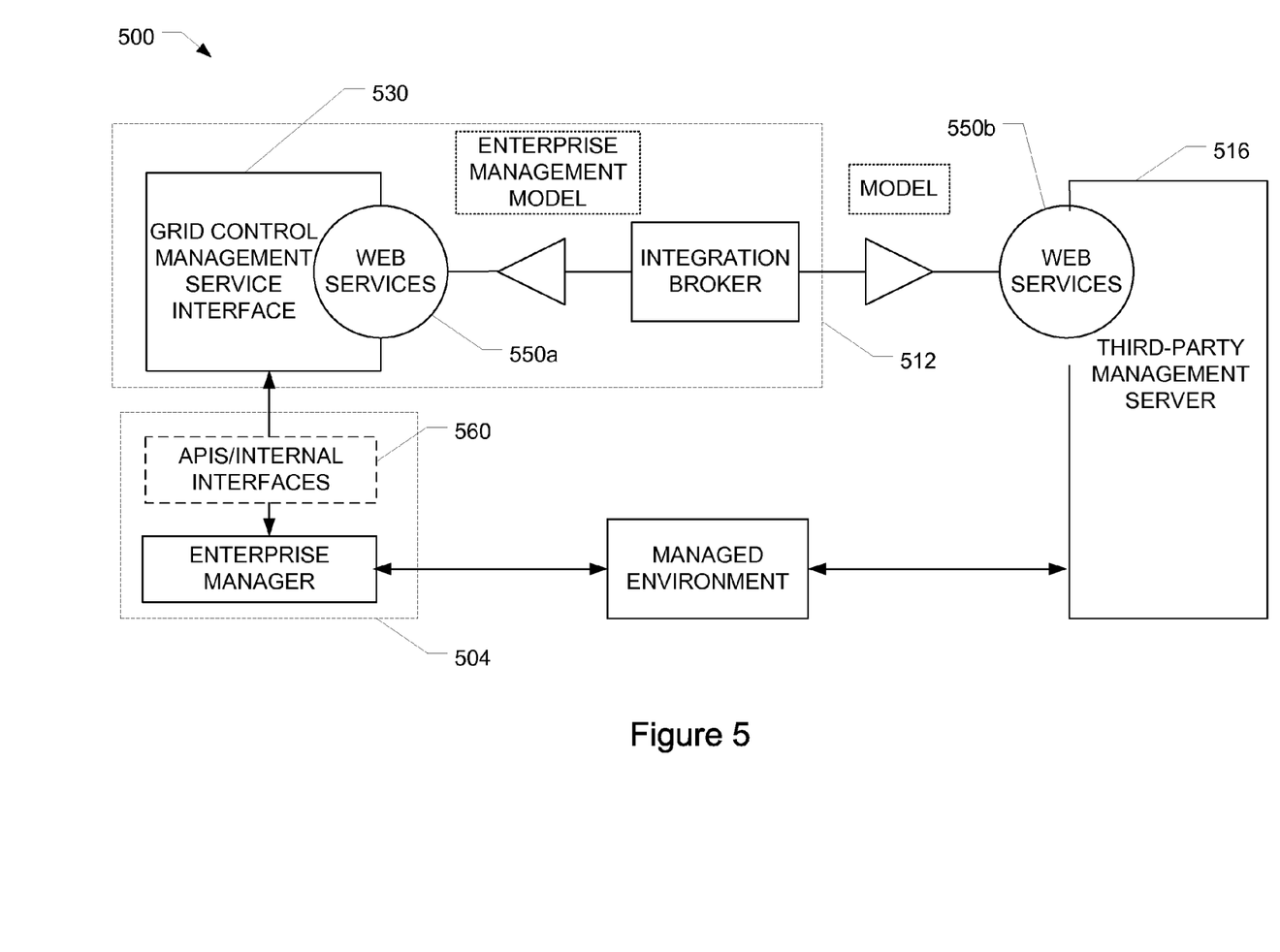
FIG. 5 is a block diagram representation of the architecture of a grid computing system which includes an integration arrangement in accordance with an embodiment of the present invention.

FIG. 5 is a block diagram representation of the architecture of a grid computing system which includes an integration arrangement in accordance with an embodiment of the present invention. A system 500 includes an enterprise manager 504, an integration arrangement 512, and at least one third-party management server or framework 516. The overall architecture of system 500 is typically a service oriented architecture, and is arranged such that each component within system may generally receive and respond to requests and responses through web services such as web services 550a, 550b. Using web services, management data may be retrieved and published, and operations may be requested either explicitly or implicitly Messages that may be sent through web services 550a, 550b are, in one embodiment, in the format of XML documents. Enterprise manager 504 may expose a web services interface that is substantially directly accessible by third party management server 516. Integration arrangement 512 may include an adapter, e.g., a pluggable adapter, that allows enterprise manager 504 to communicate with integration arrangement 512. Similarly, integration arrangement 512 may include an adapter (not shown), e.g., a pluggable adapter, that allows third-party management server 516 to communicate with integration arrangement 512.

A grid control management service interface 530 effectively allows enterprise manager 504 to substantially interface with an appropriate adapter within integration arrangement 512. In one embodiment, grid control management service interface 530 is part of integration arrangement 512. In general, integration arrangement 512 may serve as a communication bus for substantially all components that are plugged into or otherwise connected to integration arrangement 512. Enterprise manager 504 may include various APIs and internal interfaces 560, as will be discussed below with respect to FIG. 6, that facilitate communications between integration arrangement 512 and enterprise manager 504.

At times, there may be rules violations associated with third-party management server 516. Enterprise manager 504 generally monitors rules within system 500. When there are rules violations, enterprise manager 504 may interact with integration arrangement 512 to access third-party management server 516 to repair the rules violations.

Figure 6:
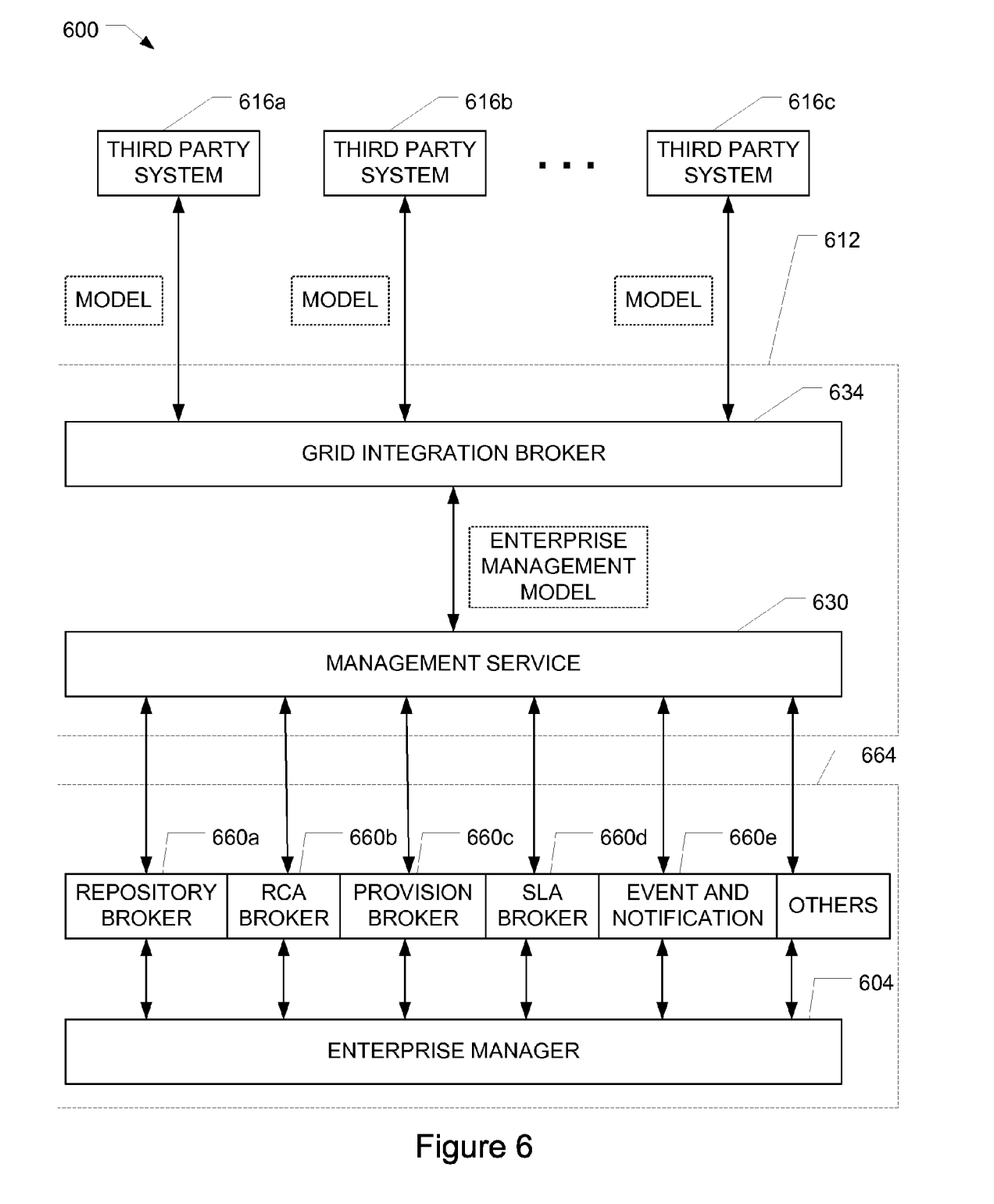
FIG. 6 is a block diagram representation of an enterprise grid computing system which includes a grid integration broker, a management service, and internal brokers associated with an enterprise manager arrangement in accordance with an embodiment of the present invention.

With reference to FIG. 6, APIs and internal interfaces which facilitate communications between an enterprise manager and an integration arrangement will be described in accordance with an embodiment of the present invention. Within a grid computing system 600, APIs and internal interfaces 660*a-e* of an enterprise manager arrangement 664 are arranged to facilitate the processing of requests sent from third-party systems or management frameworks 616*a-c* through an integration arrangement 612 that includes, in one embodiment, an integration broker 634 and a management service 630.

APIs and internal interfaces 660*a-e* include, but are not limited to, a repository broker 660*a*, a root cause analysis (RCA) broker 660*b*, a provision broker 660*c*, a service level agreement broker 660*d*, and an event and notification broker 660*e*. Repository broker 660*a* is generally arranged to communicate with a repository, as for example a management repository (not shown), to query existing objects, to create objects, or to update objects. RCA broker 660*b* is arranged to pass a request to an RCA engine of an enterprise manager 604 of enterprise manager arrangement 664 or to receive results from the RCA engine. Provision broker 660*c* is arranged to provision and to patch requests sent to enterprise manager 604. SLA broker 660*d* is arranged to handle SLA and policy related requests associated with objects or models stored in a repository such as a management repository (not shown). Event and notification broker 660*e* analyzes events, alerts, and warnings to determine whether events are to be sent to external systems. In addition, event and notification broker 660*e* receives events and notifications from external systems and publishes such events and notifications to enterprise manager 604.

Figure 7A:
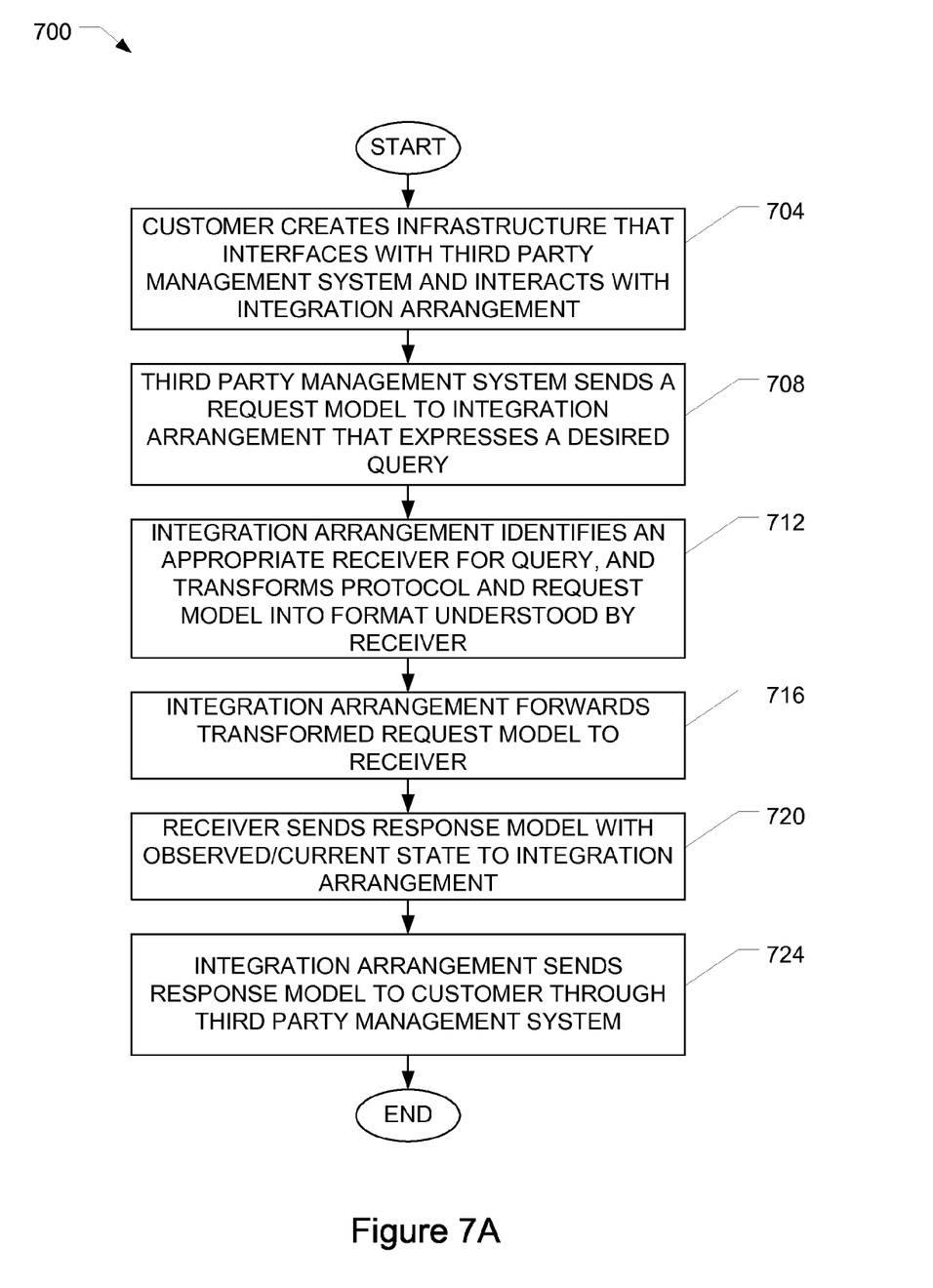
FIG. 7A is a process flow diagram which illustrates one method of operating an enterprise grid computing system with an integration arrangement when a query is made in accordance with an embodiment of the present invention.

The steps associated with registering a management framework with an integration arrangement and then utilizing the integration arrangement to broker requests may vary widely. FIG. 7A is a process flow diagram which illustrates one method of operating an enterprise grid computing system with an integration arrangement when a query is made in accordance with an embodiment of the present invention. A process 700 of operating an enterprise grid computing system with an integration arrangement begins at step 704 in which a customer creates an infrastructure that interfaces with a third-party management system or framework, and interacts with the integration arrangement. The infrastructure may be used by the customer to register the third-party management system with the integration arrangement, e.g., an integration broker of the integration arrangement. That is, a customer who obtains a third-party management system creates a system which is arranged to utilize the third-party management system to access an integration arrangement.

In step 708, the third-party management system sends a request model to the integration arrangement. The request model may express or otherwise include a state query. After receiving the request model, the integration arrangement identifies an appropriate receiver for the query in step 712. The appropriate receiver may be substantially any receiver. In one embodiment, the appropriate receiver may be the enterprise manager. Upon identifying an appropriate receiver, the integration arrangement transforms the protocol, i.e., the protocol associated with the request model, and the request model into a format that is understandable to the appropriate receiver.

The integration arrangement forwards the transformed request model to the appropriate receiver in step 716, which then updates the request model in response to the query included in the request model. To fulfill the query included in the request model, the enterprise manager may access another management system or receiver in the enterprise grid computing system, using the integration arrangement, that actually services the request and returns information to the enterprise manager. It should be appreciated that when the appropriate receiver is an enterprise manager, the enterprise manager may effectively serve the request model in a query to other receivers, and then update the request model with the request to the query served to the other receivers. The updated request model may be considered to be a response model. In step 720, the receiver sends the response model, which typically includes an observed or updated state, to the integration arrangement. Once the integration arrangement receives the response model, the integration arrangement sends the response model to the customer through the third-party management system that is interfaced with the customer. The process of operating an enterprise grid computing system to process a query is completed after the customer receives the response model.

Figure 7B:
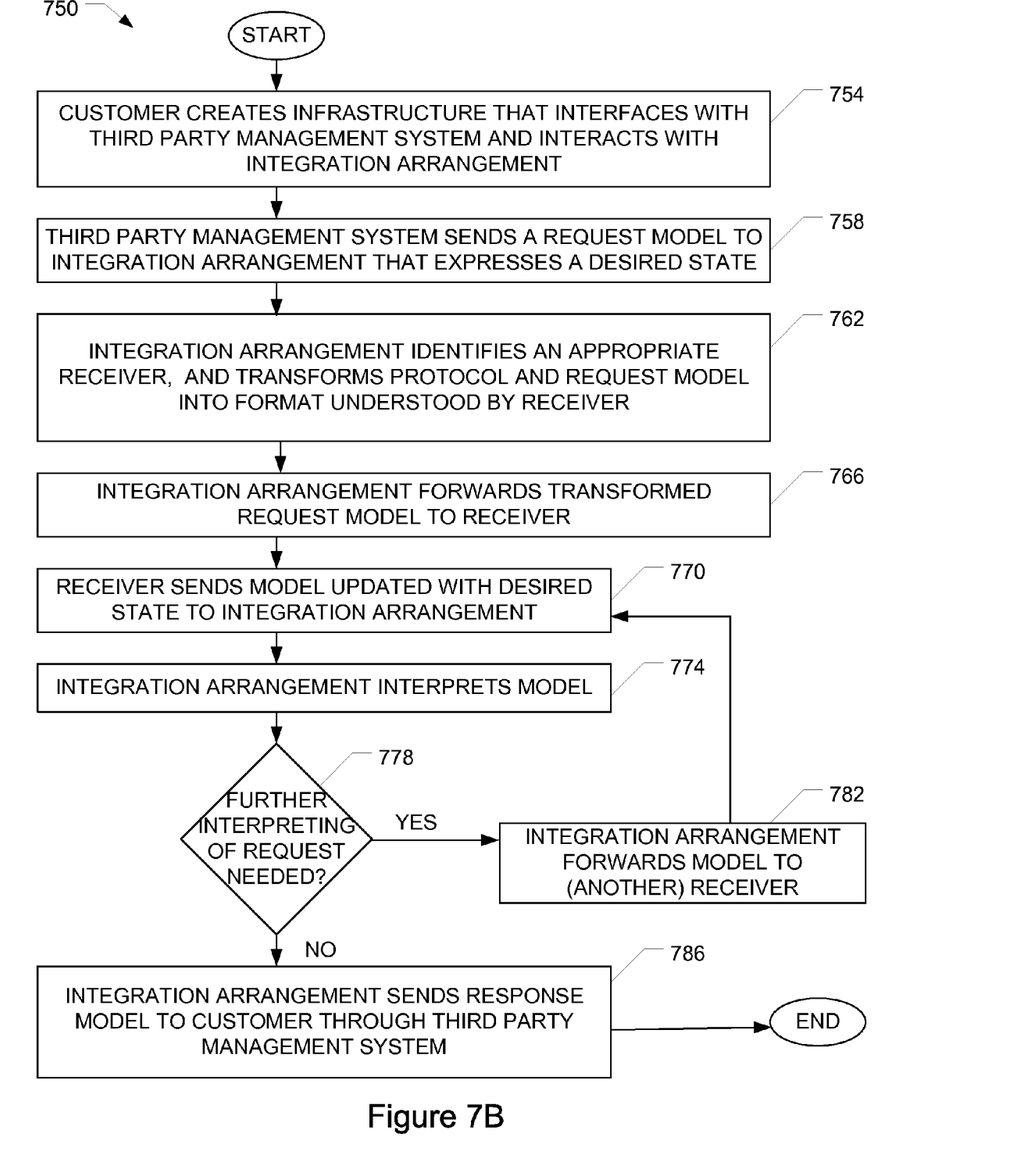
FIG. 7B is a process flow diagram which illustrates one method of operating an enterprise grid computing system with an integration arrangement when an update to a state is made in accordance with an embodiment of the present invention.

Referring next to FIG. 7B, one method of operating an enterprise grid computing system with an integration arrangement when a state is to be updated, e.g., in the course of a management operation, will be described in accordance with an embodiment of the present invention. A process 750 of operating an enterprise grid computing system begins at step 754 in which a customer creates an infrastructure that interfaces with a third-party management system or framework, and interacts with the integration arrangement. The third-party management system then sends a request model to the integration arrangement in step 758. The request model, which may be sent at the request of the customer, expresses a desired state. The desired state in the request model expresses a future state that the customer or requester desires that the grid environment to be in.

Upon receiving the request model that expresses a desired state, the integration arrangement identifies an appropriate receiver for the request model in step 762, and transforms an associated protocol and the request model into a format that may be understood by the appropriate receiver. The appropriate receiver may be substantially any receiver within the same enterprise grid computing system as the integration arrangement, e.g., the appropriate receiver may be an enterprise manager or a third-party management system.

In step 766, the integration arrangement forwards the transformed request model to the appropriate receiver, which updates the model as appropriate given the desired state. The receiver then sends the updated or response model to the integration arrangement in step 770. After receiving the response model, the integration arrangement interprets the response model in step 774. It is then determined in step 778 whether the request model is to be further interpreted. That is, it is determined whether it is necessary to further process the request model. If it is determined that the request model is not to be further interpreted, process flow moves from step 778 to step 786 in which the integration arrangement sends the response model to the customer through the third-party management system that the customer is interfaced with. Once the response model is sent to the customer, the process of operating the enterprise grid computing system is completed.

Returning to step 778, if the determination is that further interpretation of the request model is needed, the integration arrangement forwards the response model to another receiver in step 782. Then, process flow returns to step 770 in which the receiver updates the response model as appropriate according to the desired state specified in the request model, and sends the new, updated response model to the integration arrangement.

Figure 8:
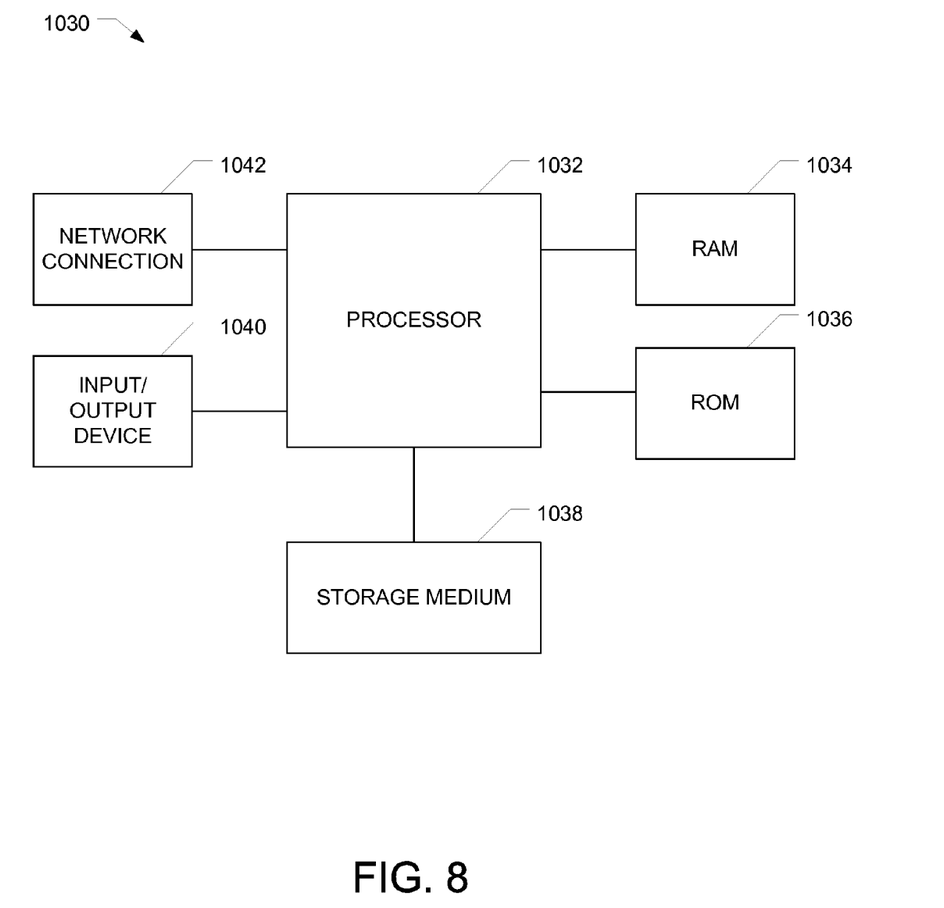
FIG. 8 illustrates a typical, general purpose computing device or computer system.

A management system or framework may generally include a computing system, as for example a server. FIG. 8 illustrates a typical, general purpose computing device or computer system. A computer system 1030 includes any number of central processing units (CPUs) 1032 that are coupled to memory devices including primary storage devices 1034 (typically a random access memory, or RAM) and primary storage devices 1036 (typically a read only memory, or ROM). ROM acts to transfer data and instructions unidirectionally to the CPU 1032, while RAM is used typically to transfer data and instructions in a bidirectional manner.

CPU 1032 may generally include any number of processors. Both primary storage devices 1034, 1036 may include any suitable computer-readable media. A secondary storage medium 1038, which is typically a mass memory device, is also coupled bidirectionally to CPU 1032 and provides additional data storage capacity. Mass memory device 1038 is a computer-readable medium that may be used to store programs including computer code devices, data, and the like. Typically, mass memory device 1038 is a storage medium such as, for example, a hard disk which is generally slower than primary storage devices 1034 and 1036. It should be appreciated that the information retained within mass memory device 1038, may, in appropriate cases, be incorporated in standard fashion as part of RAM 1036 as virtual memory. A specific primary storage device 1034 such as a CD-ROM, a DVD, or a flash memory device may also pass data unidirectionally to the CPU 1032.

CPU 1032 is also coupled to one or more input/output devices 1040 that may include, but are not limited to, devices such as video monitors, track balls, mice, keyboards, microphones, touch-sensitive displays, transducer card readers, magnetic or paper tape readers, tablets, styluses, voice or handwriting recognizers, or other well-known input devices such as, of course, other computers. Finally, CPU 1032 may be coupled to a computer or telecommunications network, e.g., a network that uses a grid automation bus or an integration arrangement, an internet network or an intranet network, using a network connection as shown generally at 1042. With such a network connection, it is contemplated that the CPU 1032 might receive information from the network, or might output information to the network in the course of performing the above-described method steps. Such information, which is often represented as a sequence of instructions to be executed using CPU 1032, may be received from and outputted to the network, for example, in the form of a computer data signal embodied in a carrier wave. The above-described devices and materials will be familiar to those of skill in the computer hardware and software arts.

Although only a few embodiments of the present invention have been described, it should be understood that the present invention may be embodied in many other specific forms without departing from the spirit or the scope of the present invention. By way of example, although a set of brokers has been described as being associated with an enterprise manager, the enterprise manager may be associated with any number of the brokers, including brokers which provide other services than those described above.

While a request has generally been described as being serviced or fulfilled by a single management framework or an enterprise manager, it should be appreciated that a request is not necessarily atomic, i.e., a request may not need to be fulfilled only by a single responding system. That is, an integration arrangement may allow a request to be fulfilled by more than one component of a grid computing environment. Additionally, an integration arrangement may be arranged to handle both concurrent and conflicting requests.

In one embodiment, the functionality associated with an integration arrangement may be incorporated as part of an enterprise manager arrangement. That is, an integration arrangement which serves as an extensible grid automation bus may effectively be included as a part of an overall enterprise manager arrangement. For example, enterprise manager 304 and integration arrangement 312 of FIG. 3A may be considered to be part of an overall enterprise manager arrangement rather than being substantially separate components.

One component or system that is plugged into an integration arrangement generally does not need to understand models associated with other components or systems. In an embodiment in which a common model format is not used, translation logic may be included in the integration arrangement. Hence, a model may be translated from a format associated with one component to a format associated with another component.

Grid computing systems may be substantially any computing system that effectively creates a dynamic computing environment that enables resources to be shared. While the present invention has been described in terms of grid computing systems, it should be appreciated that an integration arrangement may be utilized in a wide variety of computing systems including, but not limited to, computing systems which utilize computing on demand, adaptive computing, N1, utility computing, hosted computing, organic computing, and ubiquitous computing.

In general, the steps associated with methods of the present invention may vary widely. Steps may be added, removed, altered, and reordered without departing from the spirit or the scope of the present invention. Therefore, the present examples are to be considered as illustrative and not restrictive, and the invention is not to be limited to the details given herein, but may be modified within the scope of the appended claims.

What is claimed is:

1. A grid computing system comprising:
   an enterprise manager, the enterprise manager being arranged to receive a request and determine a plurality of tasks that are to be performed to satisfy the request;
   an integration arrangement, the integration arrangement being arranged to broker requests to the enterprise manager and to a plurality of management frameworks from one of a plurality of management frameworks;
   a first management framework, the first management framework being arranged to send a first request to the integration arrangement, the integration arrangement being arranged to enable the first management framework to communicate bidirectionally with the integration arrangement;

a second management framework, the second management framework being arranged to receive a first task of the plurality of tasks to be performed by the second management framework to satisfy the first request, the integration arrangement being arranged to enable the second management framework to communicate bidirectionally with the integration arrangement; and a third management framework, the third management framework being arranged to receive a second task, different from the first task, of the plurality of tasks to be performed by the third management framework to satisfy the first request, the integration arrangement being arranged to enable the third management framework to communicate bidirectionally with the integration arrangement.

2. The grid computing system of claim 1 wherein upon completion of the first task, the second management framework sends a completed first task through the integration arrangement to the enterprise manager.

3. The grid computing system of claim 2 wherein upon completion of the second task, the third management framework sends a completed second task through the integration arrangement to the enterprise manager.

4. The grid computing system of claim 3 wherein the enterprise manager receives and uses the completed first task and completed second task to generate a response to the first request, and the enterprise manager sends the response to the first request to the first management framework through the integration arrangement.

5. The grid computing system of claim 1 wherein the first management framework does not have a point-to-point connection with the enterprise manager.

6. The grid computing system of claim 1 wherein the enterprise manager has an associated management repository in communication with the enterprise manager, the management repository being arranged to store a state associated with the first and second management frameworks.

7. The grid computing system of claim 1 further comprising a plurality of brokers, the plurality of brokers being arranged to facilitate communication between the integration arrangement and the enterprise manager.

8. The grid computing system of claim 1 wherein the request is in the form of a model and wherein the integration arrangement includes a transformer, the transformer being arranged to enable the model to be transformed into a format associated with the enterprise manager.

9. The grid computing system of claim 1 wherein the grid computing system is an enterprise grid computing system.

* * * * *

UNITED STATES PATENT AND TRADEMARK OFFICE
CERTIFICATE OF CORRECTION

PATENT NO. : 7,673,029 B2  Page 1 of 1
APPLICATION NO. : 11/306081
DATED : March 2, 2010
INVENTOR(S) : Zheng Mi et al.

It is certified that error appears in the above-identified patent and that said Letters Patent is hereby corrected as shown below:

In column 8, line 58, after "implicitly" insert -- . --.

Signed and Sealed this

Twenty-eighth Day of September, 2010

David J. Kappos
*Director of the United States Patent and Trademark Office*